Patented May 6, 1924.

1,493,182

UNITED STATES PATENT OFFICE.

JEAN ALTWEGG AND PAUL PIVOT, OF LYON, FRANCE, ASSIGNORS TO SOCIÉTÉ CHIMIQUE DES USINES DU RHONE, OF PARIS, FRANCE.

PROCESS FOR THE PRODUCTION OF DIETHYLCHLORACETAMIDE.

No Drawing.    Application filed March 6, 1923. Serial No. 623,280.

*To all whom it may concern:*

Be it known that we, JEAN ALTWEGG, residing at Lyon, Rhone, France, a citizen of the Republic of Switzerland, and PAUL PIVOT, residing at Lyon, Rhone, France, a citizen of the Republic of France, have invented certain new and useful Improvements in Processes for the Production of Diethylchloracetamide, of which the following is a specification.

Among the derivatives of urea and the amides of brominated fatty acids, there is a series of compounds which are valuable on account of their hypnotic properties (as, for example, "adalin," "bromural," "neuronal" and so on).

In these compounds when the bromine is replaced by chlorine, substances are obtained the narcotic effect of which is reduced and in consequence they have not been used in therapeutics (see Fraenkel "Die Arzneimittelsynthese," 4th edn., bottom of page 471).

The surprising fact has now been discovered that diethylchloracetamide is considerably more effective than the corresponding bromine derivative and in addition has the valuable property of producing very rapidly a deep sleep followed by a tranquil awakening.

These properties, which could not have been foreseen, have probably their source in the relatively easy solubility of these compounds in water. Whereas 1 litre of water dissolves 8.7 gr. of the corresponding brominated acid-amide, the new chlorine compound is soluble to the extent of 14.2 gr.

The amide, which has not been previously described, can be produced for example by treating the diethylacetylchloride with chlorine. In so doing monochlor-acid chloride is obtained which is converted in a known manner into acid-amide as for example by treatment with aqueous ammonia or a substance giving off ammonia, for instance, by adding ammonium carbonate and warming until ammonia is liberated.

*Example.*

1 Mol. diethylacetylchloride is warmed to 90° C., 2 atoms of chlorine are then introduced, maintaining a temperature up to about 100° C. By distilling under a partial vacuum, the $\alpha$-chlordiethylacetylchloride is obtained, in an almost theoretic yield, in the form of a liquid which passes over under a pressure of 70 m/m at 93° C.

By shaking this chloride with an excess of concentrated aqueous ammonia, diethylchloracetamide is obtained quantitatively in the form of white scales, which when recrystallized melt at 58° C.

What we claim and desire to secure by Letters Patent is:—

As a new product, diethylchloracetamide.

In testimony whereof we have signed our names to this specification.

JEAN ALTWEGG.
PAUL PIVOT.